June 18, 1963    R. W. HENDRICK, JR    3,094,625
PHOTOELECTRIC APPARATUS FOR MEASURING THE SIZE OF PARTICLES
Filed Nov. 6, 1959    2 Sheets-Sheet 1
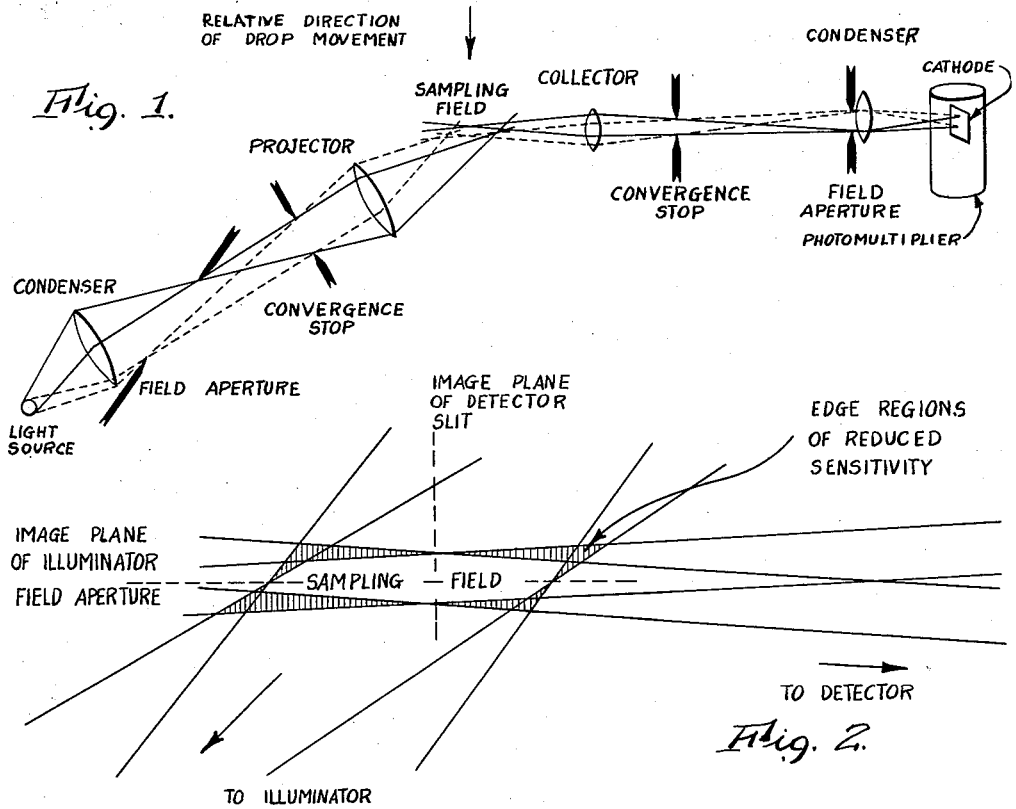
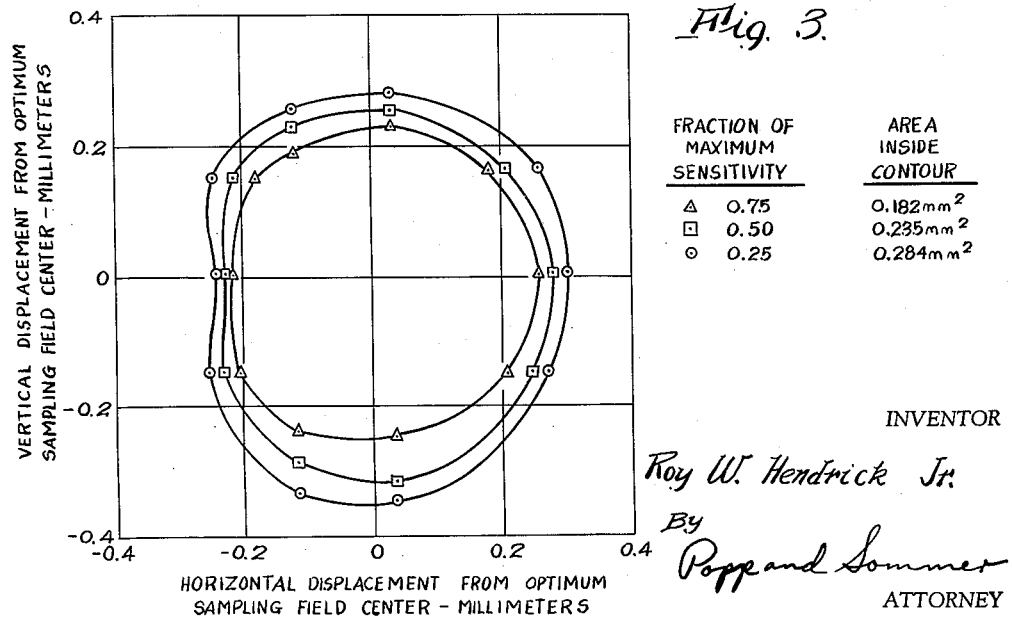
INVENTOR
Roy W. Hendrick Jr.
By
Popp and Sommer
ATTORNEY June 18, 1963    R. W. HENDRICK, JR    3,094,625
PHOTOELECTRIC APPARATUS FOR MEASURING THE SIZE OF PARTICLES
Filed Nov. 6, 1959    2 Sheets-Sheet 2
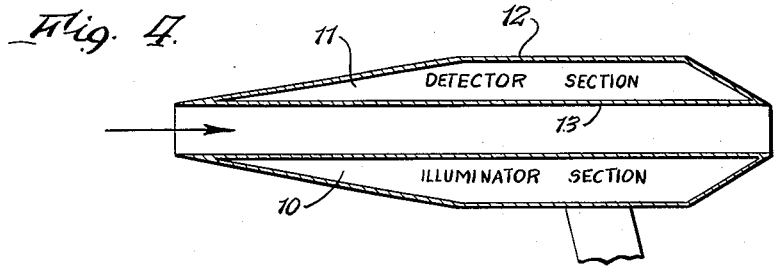
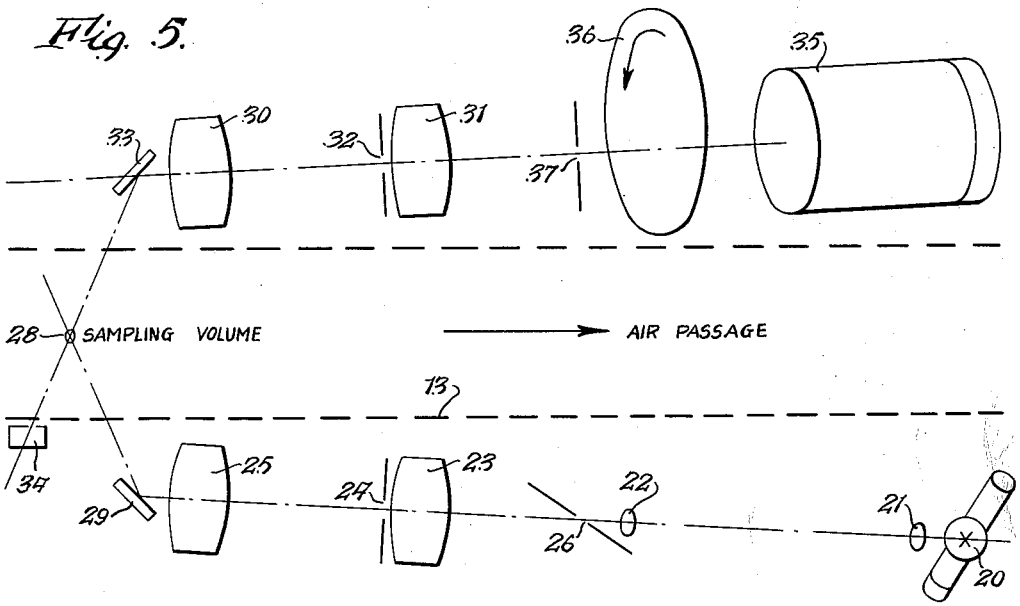
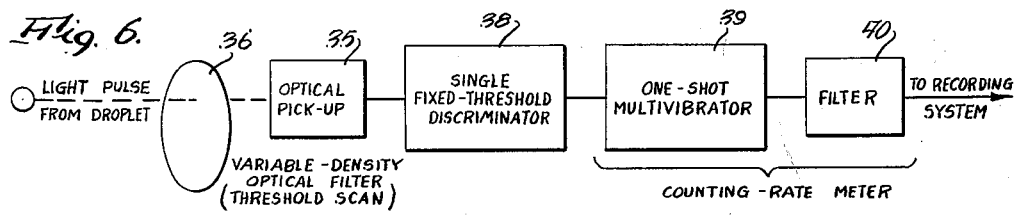
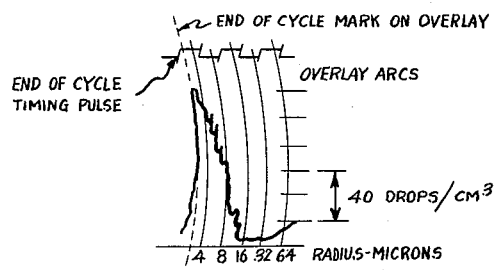
Fig. 7.
INVENTOR
Roy W. Hendrick Jr.
BY Popp and Sommer
ATTORNEY

United States Patent Office 3,094,625
Patented June 18, 1963

3,094,625
PHOTOELECTRIC APPARATUS FOR MEASURING THE SIZE OF PARTICLES
Roy W. Hendrick, Jr., Santa Barbara, Calif., assignor to Cornell Aeronautical Laboratory, Inc., Buffalo, N.Y., a corporation of New York
Filed Nov. 6, 1959, Ser. No. 851,374
4 Claims. (Cl. 250—218)

This invention relates to apparatus for determining the size of particles suspended in a fluid by measuring the amount of light scattered thereby in a nearly forward direction, and more particularly to apparatus for measuring the number distribution of particle sizes.

While the invention may be embodied in various forms of apparatus, the embodiment illustrated is an airborne instrument for measuring the spectrum of the concentration of droplets of various radii in clouds. Such a device is known as a disdrometer and is useful in meteorological studies. The droplet size spectrum obtained is of the cumulative distribution type, that is, the number of droplets with radii larger than a certain threshold level, the threshold being sequentially varied during a cycle of predetermined and brief duration.

Although a major identifying characteristic of a cloud is the visible liquid water contained in it, the detailed physical characteristics of that cloud water are not well known. In particular, numerical concentrations of droplets of various radii, the droplet spectra, within clouds are not known comprehensively, and much of the available data is not reliable in all droplet size ranges. This lack of knowledge of the constitution of a cloud is a direct reflection of the lack of a suitable instrument for measuring the spectrum of cloud droplets.

This lack hampers the formulation of adequate cloud growth theories and, as well, inhibits the development of practical techniques that depend upon cloud characteristics. For instance, in aircraft icing studies calculations have been carried out to determine where droplets of various sizes will impinge on an aircraft when flying through a cloud. These calculations point out regions of the craft which will accumulate ice. But the usefulness of this type of computation is reduced by the absence of a suitable method of furnishing the required data on the size of drops which occur inside natural clouds. If accurate drop-size data were available, more precise calculations could be made and experimentally confirmed with a degree of precision not now available. Even the possibility of testing anti-icing equipment under less adverse conditions than actual icing and extrapolating the results to icing conditions might be possible.

Accordingly, an object of the present invention is to provide an optical forward-scattering disdrometer which scans the spectrum of droplet radii from about 2 to about 100 microns.

Another object is to provide such a disdrometer which resolves the spectrum range into a predetermined number of geometrically spaced radius increments.

Another object is to provide such a disdrometer which determines radii with a small error.

A further object is to provide such a disdrometer which obtains a spectrum cyclically.

Another object is to provide such a disdrometer which maintains its reliability for concentrations up to 4,000 droplets per cubic centimeter.

Another object is to provide such a disdrometer which can operate at flight speeds up to 300 knots true air speed.

Still a further object is to provide such a disdrometer which records the spectrum with a direct writing oscillograph so that such spectrum is immediately available during flight.

Other objects and advantages of the present invention will be apparent from the following detailed description and accompanying drawings in which:

FIG. 1 is a schematic view of the optical system of a forward-scattering disdrometer embodying the principles of the present invention.

FIG. 2 is a schematic view showing how the sampling field is limited optically.

FIG. 3 is a graph showing the contours of equal sensitivity of the disdrometer sampling field.

FIG. 4 is a central, longitudinal, diagrammatic, sectional view through an airborne disdrometer.

FIG. 5 is a diagrammatic view of the optical system of the disdrometer.

FIG. 6 is a diagrammatic view of the discriminator and counting-rate meter associated with the photomultiplier shown in FIG. 5.

FIG. 7 is a typical record made by the disdrometer and showing graphically the size distribution of droplets in a cloud through which the airborne disdrometer was flown.

The disdrometer illustrated as a preferred embodiment of the present invention is an instrument which uses the magnitude of forward scattering at about 28° from the direction of illumination as a measure of the size of individual droplets passing through its sampling field. The sampling field is limited in size by the optical characteristics of the instrument rather than by any mechanical stops.

The disdrometer consists of two units including a sensing unit and a control console. The sensing unit which is diagrammatically illustrated in FIG. 4 is mounted on the top of an aircraft and projects outwardly and into the air stream. The control console is mounted inside the aircraft. The two units are connected together by suitable conductive cables.

The sensing unit includes an illuminator section 10 and a detector section 11 suitably housed within a cone-capped cylinder 12. The sections 10 and 11 are disposed so as to provide a central cylindrical tube 13, open at its opposite ends, which extends longitudinally and centrally of the cone-capped cylinder 12.

A portion of the cloud being studied passes down the central cylindrical tube 13 and is sampled along the axis of this tube. Because of this central location and small size as will be explained hereinafter, compared to the diameter of the tube 13, the sampling region or field is free of undesired changes in cloud concentration due to aerodynamic effects.

In general, the optical system is arranged to illuminate the sampling region through which a droplet passes so as to scatter light forwardly therefrom which is detected and evaluated into information which determines the size of the particle which scattered the light. The detector section of the optical system collects the light scattered from the droplet and projects the light through a variable-density attenuator disc onto the photo-cathode of a photomultiplier tube. Rotation of the variable-density disc produces an attenuation that varies cyclically from maximum to minimum during a scan cycle of the system of predetermined duration, such as two seconds. Thus, during the cycle the size of a droplet which will produce a given amplitude light or electrical pulse varies in similar cyclical fashion. A discriminator passes those photomultiplier output pulses which exceed a pretermined threshold, and a counting-rate meter produces a D.-C. output proportional to the rate of arrival of pulses which pass the threshold. Because the incident light amplitude needed to produce a super-threshold pulse is altered by the variable attenuator disc, the size of those droplets which produce super-threshold signals will vary according to how far the scan cycle has advanced. With a simple single-level discriminator at any given moment the instrument will count droplets larger than a particular threshold size and, thus, directly produce a cumulative distribution. The signal from the counting-rate meter is then amplified and recorded on a direct writing oscillograph.

The sensing unit diagrammatically illustrated in FIG. 4 contains all the optical elements plus the discriminator, counting-rate meter, and regular circuits of the photomultiplier tube. The control console which is arranged inside the aircraft contains power supplies, the recorder amplifier, and the recorder.

The optical system is required to produce a very small sampling volume in order that, in the presence of high concentrations of droplets, only one droplet will be in the sampling volume at a time. Assuming droplet concentrations up to 4,000 per cubic centimeter, a "small" volume would be approximately $2 \times 10^{-5}$ cubic centimeters. During 90% of the time a single droplet will occupy the sampling volume.

As a consequence of the sampling volume size, extremely short pulses of about $\frac{1}{3}$ to $\frac{1}{2}$ micro-second duration will be produced by passage of droplets. Hence, the light source must be extremely bright and the optical system extremely fast in order that light scattered by droplets will be enough to permit accurate measurement of droplet size.

The optical system is illustrated in the simplified schematic of FIG. 1. As there shown, light from a source passes through a condenser, thence through a field aperture, thence through a convergence stop, following which the light passes through a projector toward the sampling field which is generally a disc-shaped body of light through which the drop moves at right angles to the plane thereof. Light scattered from the droplet passing through the sampling field is collected by a collector which projects the light through a convergence stop, through a field aperture, thence through a condenser which focuses the light on the cathode of a photomultiplier.

An exaggerated view of the sampling field is illustrated in FIG. 2. It will be noted that the sampling field is limited purely by optical means and yet relatively large convergences in the optical system are maintained. FIG. 2 represents a section through the sampling volume that contains the optical axes of both the detector and the illuminator sections. As limited by the detector section, the instrument looks at only a thin sheet. The problem of receiving as much light as possible from the drop, yet keeping the boundaries of the sheet as sharp as possible, is solved by having a large angle of acceptance in a plane perpendicular to the figure and a small acceptance angle in the plane of the figure.

Light from the illumination aperture is focused in the thin detector sheet so that the intensity falls off rapidly from the focus at the edge of the field. There are, unavoidably, regions of reduced sensitivity, because of both geometrical and diffraction effects. Those of geometrical origin are the cross-hatched sections in FIG. 2. Diffraction influences are manifested by a blurring (not shown) of the top and bottom of the detector sheet. The physical extent of such geometrical and diffraction effects is illustrated in FIG. 3 which shows the detection sensitivity of the system as a function of position within the field. The sensitivity plotted is the maximum a droplet would encounter as it traversed the sampling field along its normal path. The field asymmetry is due to the oblique angle between the optical axis and plane of focus of the sampling field.

The elements of the main optical system of the sensing unit are shown in FIG. 5. A bright mercury arc-light source 20 is focused by lenses 21, 22 and 23 onto a convergent aperture 24, and thence by lens 25 to infinity. The arc fully illuminates a field aperture 26 arranged between the condenser lens 22 and field lens 23. The field aperture 24 is imaged by field lens 23 and projection lens 25 onto the sampling region 28 after reflection from a mirror 29. Complete illumination of the field aperture 26 is insured by the provision that condenser lens 22 focuses an image of the field aperture back on the opening of condenser lens 21, and that this image is totally within the open aperture and, consequently, fully illuminated. The field aperture 26 determines the size of the illuminated area at the sampling volume 28. The convergent aperture 24 determines the solid angles over which the sample is illuminated. The field aperture 26 is slanted so that its image is in the plane of the detector system.

It will be noted that the elements 20, 21, 22, 23, 24, 25, 26 and 29, which constitute the illuminator section depicted in FIG. 4, are arranged on one side of the tube 13 through which the droplets pass and on the central axis of which the sampling volume 28 is disposed.

When a particle passes the illuminated area 28, and, simultaneously, is in the thin sheet observed by the detector section which is made up of those elements shown in FIG. 5 arranged above the tube 13, the particle scatters light into the detector system. Lenses 30 and 31 thereof form a real image of the detector exit slit at the sampling field as previously discussed. A detector convergence aperture 32 is used to limit the light-acceptance angle of the detector system, and, hence, control the rate at which the observed region thickens at points successively further from the detector slit image. A mirror 33 is disposed so as to reflect the light scattered by the droplet in the sampling volume 28 through the projection lens 30.

The two mirrors 29 and 33, which combine the illuminator and detector beams, are required because of the particular disposition of the respective elements of the illuminator and detector sections on opposite side of the central cylindrical tube 13.

The detector section or system looks into a black cavity 34 so that in the absence of a scattering particle in the sampling volume 28 no signal is produced.

The device shown in FIG. 5 classifies the amplitude of the output light pulses by determining the rate at which a certain threshold light amplitude is exceeded and by sequentially varying the value of the threshold. The spectrum obtained is a cumulative distribution curve which displays, as a function of size, the number of items which are larger than that size. An electron photomultiplier 35 converts the light pulses to electronic pulses and a rate meter counts those which exceed a fixed predetermined electrical threshold.

A rotatable, variable density disc 36 is operatively arranged between the photomultiplier 35 and the fixed lens 31 and provides a variable threshold scan. The filter disc 36 is a commercially available item and any suitable means for rotating the same may be employed. A field aperture 37 is arranged between the scan-disc 36 and the lens 31. The scan-disc 36 transmits, depending on its orientation, various fractions of the incident light to produce threshold scanning. Varying the position of this disc alters the incident light amplitude that will produce a super-threshold signal.

The problem of scanning the droplet size spectrum is compounded by the square law dependence of scattered light upon droplet radius. That is, if a scan of about a 30 to 1 ratio of radii is desired a scan of about a 900 to 1 ratio of light intensity is necessary. This needed range is readily obtained in an optical system.

The spectrum scanning system is diagrammed in FIG. 6. As there depicted, a light pulse from a droplet is optically directed to pass through the variable-density optical filter 36 to provide a threshold scan. The light passed by the scan-disc 36 is picked up optically by the photomutiplier tube 35. The electronic pulses from this photomultiplier are fed to a single fixed-threshold discriminator of any suitable construction and represented diagrammatically at 38 in FIG. 6. This discriminator 38 passes those output pulses from the photomultiplier 35 which exceed a predetermined threshold. A counting-rate meter comprising a one-shot multivibrator and a filter as represented at 39 and 40, respectively, in FIG. 6, produces a D.-C. output which is proportional to the rate of arrival of pulses which pass the threshold. This D.-C. output controls a recorder amplifier and recorder (not shown). These electrical and electronic elements are well understood by those skilled in the art and hence a detailed disclosure of the same here is unnecessary.

Thus, light pulses, generated as droplets traverse the sampling field of the disdrometer, are passed through the rotatable, circular, variable-density optical filter 36. Just as the discriminator threshold is fixed, so is the light intensity at the optical pick-up which is required to produce a pulse just exceeding the threshold.

The circular filter 36 has the characteristic that its optical density is proportional to angular displacement from a reference position. If the filter rotates with a constant angular frequency it is possible to express the droplet size which will produce a threshold amplitude light pulse at a given time. The light pulse intensity, before passing the variable-density filter 36, produced by the threshold-size droplet, is proportional to the square of the threshold radius. Thus, the logarithm of the threshold radius varies directly with time, starting with the largest droplets and scanning down to the smallest. Moreover, since all droplets with radii greater than the instantaneous threshold pass the discriminator and are subsequently counted, a cumulative drop size distribution is produced.

Each revolution of the optical filter disc 36 produces a complete distribution spectrum in which equal increments of time represent constant fractional decreases in droplet radius. The optical density variation of three (log 1000) produces a ratio of maximum-to-minimum threshold radii which is the square root of 1000 or about 32, in correspondence with the stated objective.

The function of the rate meter and discriminator shown in FIG. 6 is to produce an output proportional to the number of incoming pulses that are larger than a fixed threshold. It is basically a monostable multivibrator that produces one fixed-amplitude, fixed-duration pulse for each input pulse. The counting rate meter output is filtered to average the incoming pulses over a suitable time interval.

The recorder amplifier (not shown) amplifies the output of the counting rate meter so that it can drive the recorder (not shown). If the data from the disdrometer are to be immediately available for observation and use, the system must operate a direct-writing recorder of any suitable type, as is preferred.

The disdrometer produces a cumulative drop size distribution, that is, one in which the number of droplets with radii larger than a particular threshold value is determinaed as a function of the threshold radius. In the disdrometer illustrated, the radius threshold is varied to produce a logarithmic plot of droplet radius with time; in equal increments of time the threshold radius changes by a constant multiplying factor. For instance, it takes roughly 0.4 second for the threshold to vary from 4 to 8 microns, another 0.4 second from 8 to 16, another 0.4 second from 16 to 32, and so on.

FIG. 7 qualitatively illustrates cumulative distribution of typical test data obtained by flying through a cloud formation using such a logarithmic radius scan, as would appear on the recorder paper. As part of the illustration of FIG. 1, a transparent overlay is depicted. Such overlay is made on which radius scales have been reproduced for the various useful paper speeds. Vertical lines on these overlays are curved to match the recorder paper and are spaced so that the distance between them corresponds to halving the threshold radius of a droplet.

The proper position of the radius overlay scale with respect to a record is obtained from a calibration using an internal standard scatterer. The calibration produces a signal which is equivalent to a cloud consisting entirely of droplets 8 microns in radius. The overlay is positioned so that the 8-micron calibration arc coincides with the rise of the calibration signal on the record, and a mark is drawn on the overlay at the pulse which indicates the end of the cycle. As shown in FIG. 7, the end-of-cycle pulse is the short one of the series produced by one of the side event marker pens. This fact is indicated at the top of FIG. 7. As shown, the end-of-cycle mark is drawn as a dotted arc across the overlay at about a 3-micron radius. If the overlay is positioned with this end-of-cycle mark coincident with the end-of-cycle mark on the distribution record, the overlay radius scale is properly positioned and the droplet radii of the record can be read directly from the overlay.

For example, in the actual record reproduced in FIG. 7, there is an insignificant number of droplets larger than 16 microns, but there is a group of droplets with radii between about 12 and 13 microns, which cause an abrupt rise in the record. The fact that the record is then fairly constant down to 8 microns indicates that there are no additional droplets being gathered in that radius region. Another group of droplets with radii near 8 microns is indicated by a second jump at 8 microns. From there down to a minimum detectable radius of about 3 microns there is a continuously increasing number of droplets larger than the threshold.

Small oscillations in the record, particularly where the deflection decreases in droplet radii, are due to inhomogeneity of the clouds because of the nature of the cumulative distribution. This type of distribution records the number of droplets larger than the threshold, and in a uniform cloud, as the threshold is lowered from one threshold to the second, the instrument must record not only the number of drops larger than the first but, in addition, the drops intermediate in size between the two thresholds, and consequently, it must produce an ever mounting output signal.

The diminutions with decreasing radius shown in the experimental disdrometer record of FIG. 7 can occur because the practical instrument records at a particular moment the rate at which droplets larger than the threshold are passing, rather than store radius information about all droplets passing during a cycle and then record the distribution spectrum of the entire group. In other words, the disdrometer records the instantaneous number of droplets larger than the threshold, but various portions of cloud are examined while scanning different portions of the spectrum. At a 200-knot air speed it requires 200 meters of cloud to scan a full spectrum.

A modification which will improve the utilization of the data obtained by the disdrometer, in applications where immediate use of the record is not necessary, is to change from the discriminator and counting-rate meter to scaling circuits with a decimal read-out onto a tape recording. This change would facilitate handling and summarizing of the data, particularly if, as mentioned previously, data are obtained from inhomogenous clouds. The tape-recorded information could be played through automatic data-handling equipment to average the spectra over several disdrometer cycles. Smooth, averaged curves would be produced without the sudden drops and rises caused by sudden changes in the cloud composition.

For this sort of application it would be preferred to get a number distribution rather than the cumulative distribution discussed hereinabove in connection with the embodiment illustrated. A window type discriminator that counts the number of particles in a given range of radii would be needed rather than the simple single-level discriminator mentioned previously. Simple modification of standard scaling circuits and tape recording systems would be suitable for making this modification.

Outside the realm of meteorological studies, there are many possible applications of the present invention, since many diverse situations need the measurement of dispersions of fine particles or drops. A few examples are studying or monitoring spray processes, monitoring atmospheric dust contaminants, and measuring milled powder distribution.

The general principles of the present invention can be embodied in various ways so that different portions of the drop spectrum can be studied. Because of edge effects, which become increasingly evident for smaller sampling fields and faster optical systems, any great extension of the system to the measurement of smaller droplets must be accomplished at the expense of sampling rate.

In addition, the principles of the present invention can be applied to the development of an instrument for measuring drops of a radius larger than 100 microns. However, many design parameters are involved and great care must be taken to balance them. Chief among them is that if a given light source is used to illuminate a larger sampling area, then the brightness at the sampling field decreases inversely with the area.

Many variations in the application of the principles of the present invention to particular uses will be apparent to those skilled in the art. The embodiment shown specifically is, therefore, illustrative and not limitative of the invention the scope of which is to be measured by the appended claims.

What is claimed is:

1. In apparatus for measuring the size of particles suspended in a fluid, the combination comprising illuminator means arranged to project a beam of light into the path of moving particle laden fluid, including a light source from which light passes through a condenser, thence through a field aperture, thence through a convergence stop and thence through a projector, and detector means arranged to collect light scattered by a particle illuminated by said beam, including a collector, a convergence stop, a field aperture, a condenser and a photomultiplier, said detector means having a relatively large angle of acceptance in a plane perpendicular to the direction of motion of said fluid and a relatively small angle of acceptance in a plane parallel to said direction, whereby an illuminated field dimensionally smaller in said direction than perpendicularly thereto is provided.

2. In apparatus for analyzing droplets in a sky cloud, the combination comprising open-ended tubular means defining a passage having a central longitudinal axis and movable through a cloud so that a portion of the cloud moves undisturbed through said passage along said axis, means providing an illuminated sampling volume located on said axis within said passage and arranged to be traversed by the undisturbed portion of the cloud moving through said passage, said sampling volume being dimensionally smaller in the direction of said axis than perpendicularly thereto, and means for measuring the light scattered by droplets in said undisturbed portion moving successively through said sampling volume.

3. In apparatus for cyclically analyzing the size spectrum of droplets in a sky cloud, the combination comprising open-ended tubular means defining a passage having a central longitudinal axis and movable through a cloud so that a portion of the cloud moves undisturbed aerodynamically through said passage along said axis, means providing an illuminated sampling volume located on said axis within said passage and arranged to be traversed by the undisturbed portion of the cloud moving through said passage, means for measuring the light above a predetermined level scattered by droplets in said undisturbed portion moving successively through said sampling volume, and means for cyclically varying the value of said level.

4. In apparatus for cyclically analyzing the integral size spectrum of droplets in a sky cloud having radii falling in the range of from about 2 to about 100 microns, the combination comprising open-ended tubular means defining a passage having a central longitudinal axis and movable through a cloud at a true air speed of up to about 300 knots so that a portion of the cloud moves undisturbed aerodynamically through said passage along said axis, means providing an illuminated generally disc-shaped sampling region having a volume of about $2 \times 10^{-5}$ cubic centimeters located on said axis within said passage and arranged to be traversed by the undisturbed portion of the cloud moving through said passage, means for measuring the light above a predetermined level scattered by droplets in said undisturbed portion moving successively through said sampling region, and means for cyclically varying such as at about two second intervals the value of said level from maximum to minimum.

References Cited in the file of this patent

UNITED STATES PATENTS

| | | |
|---|---|---|
| 1,937,722 | Simon et al. | Dec. 5, 1933 |
| 1,954,338 | Tuttle et al. | Apr. 10, 1934 |
| 2,541,512 | Hahn | Feb. 13, 1951 |
| 2,684,008 | Vonnegut | July 20, 1954 |
| 2,732,753 | O'Konski | Jan. 31, 1956 |
| 2,850,239 | Polanyi et al. | Sept. 2, 1958 |
| 2,873,644 | Kremen et al. | Feb. 17, 1959 |
| 2,920,525 | Appel et al. | Jan. 12, 1960 |